United States Patent [15] 3,685,023
Snyder [45] Aug. 15, 1972

[54] SCANNING ARRANGEMENT FOR A MULTICHANNEL TOTALIZING SYSTEM

[72] Inventor: Carl J. Snyder, Raleigh, N.C.

[73] Assignee: Westinghouse Electric Corporation, Pittsburgh, Pa.

[22] Filed: Aug. 26, 1970

[21] Appl. No.: 67,178

[52] U.S. Cl. ............................340/172.5, 340/147 R
[51] Int. Cl. ...............................................G06f 3/00
[58] Field of Search.......340/172.5, 147 R, 150, 151, 340/152, 413; 179/15 AL

[56] References Cited

UNITED STATES PATENTS

| | | | |
|---|---|---|---|
| 3,323,107 | 5/1967 | Du Vall | 340/147 |
| 3,517,130 | 6/1970 | Rynders | 179/15 |
| 3,522,387 | 7/1970 | Schonemeyer et al | 340/147 X |
| 3,133,267 | 5/1964 | White | 340/147 |
| 3,289,170 | 11/1966 | Currey et al. | 340/172.5 |
| 3,327,292 | 6/1967 | Eriksson et al. | 340/172.5 |
| 3,369,221 | 2/1968 | Lethin et al. | 340/172.5 |
| 3,492,649 | 1/1970 | Polillo | 340/151 |

OTHER PUBLICATIONS

Walters, N. L., " Polling System" in IBM Technical Disclosure Bulletin, Vol. 12, No. 11; April, 1970; pp. 1918- 1919

*Primary Examiner*—Paul J. Henon
*Assistant Examiner*—Melvin B. Chapnick
*Attorney*—A. T. Stratton and C. L. Freedman

[57] ABSTRACT

Pulses received over a plurality of channels are stored in storage devices. These storage devices are scanned rapidly for the purpose of detecting the presence of stored pulses. When a stored pulse is encountered, it is read out to generate an impulse at an output pulse device that is supplied to a receiver and the scan continuation is delayed for a time sufficient to assure operation of the receiver.

2 Claims, 1 Drawing Figure

PATENTED AUG 15 1972
3,685,023
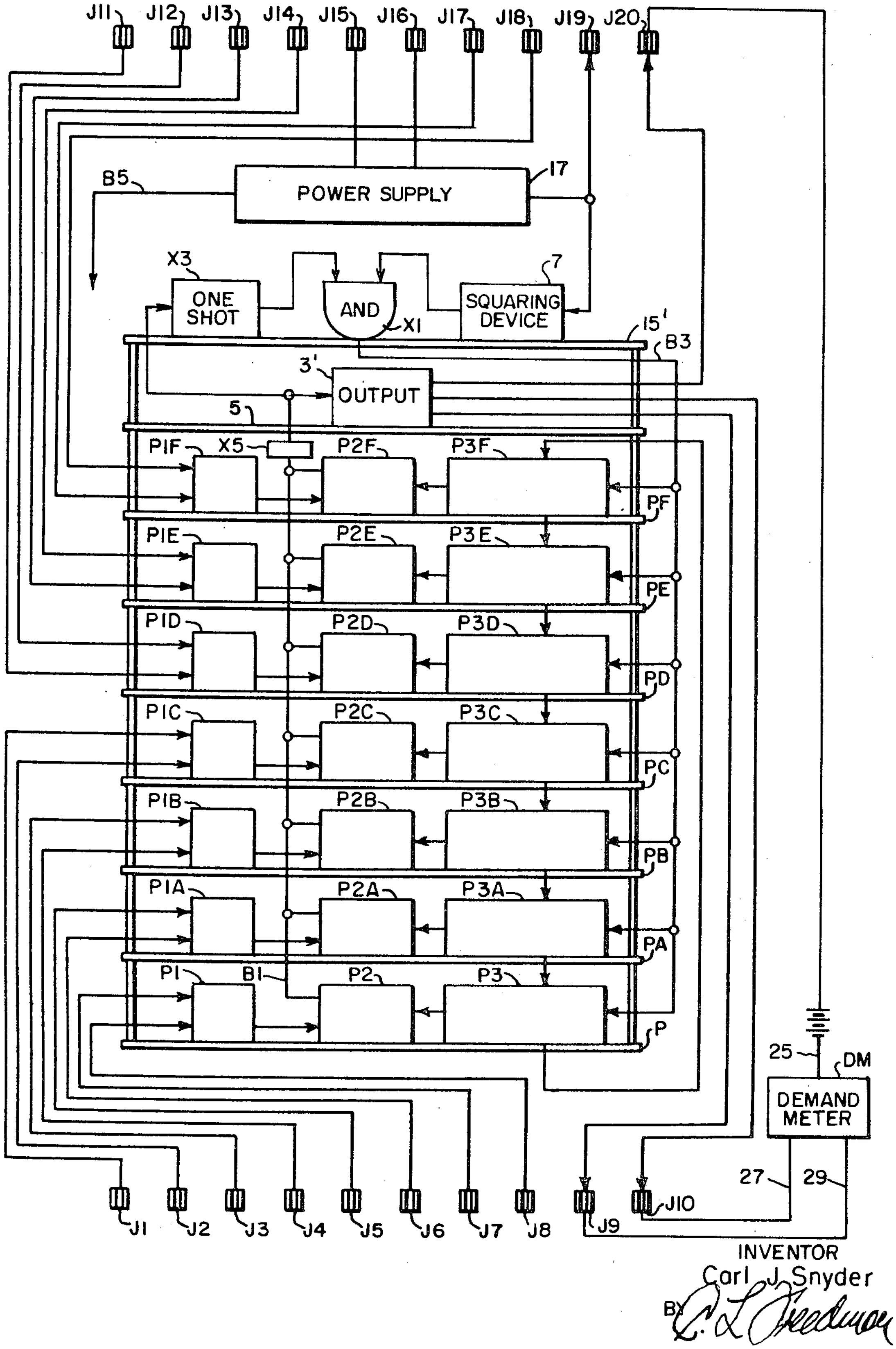
INVENTOR
Carl J. Snyder
BY C. L. Freedman
ATTORNEY

SCANNING ARRANGEMENT FOR A MULTICHANNEL TOTALIZING SYSTEM

BACKGROUND OF THE INVENTION

1. Field of the Invention:

This invention relates to computing systems and it has particular relation to impulse totalizers for totalizing impulses derived from watthour meters.

2. Description of the Prior Art:

In a prior art totalizing system pulses received from a plurality of watthour meters have been stored in storage devices with one storage device being provided for each of the watthour meters or channels. These storage devices are scanned at a uniform rate for the purpose of detecting the presence of stored impulses. Each stored impulse is read out and generates an impulse at an output pulse device which is transmitted to a receiving device.

The rate of scan is slow enough to assure operation of the receiving device for each output pulse. In a conventional unit having a 1:1 ratio of input pulses to output pulses one channel requires roughly one second for interrogation. Thus, for seven channels an input pulse may be stored for a maximum of roughly seven seconds before it is detected or picked up. The maximum input rate is determined by the output rate which must be slow enough to satisfy the requirements of the receiving device. This seriously limits the rate at which input pulses can be accepted.

It has been proposed that the scanning rate be adjustable. This may necessitate an adjustment of the scanning rate each time a system is modified. This approach does not provide any accommodation for changes occurring in a system during operation.

SUMMARY OF THE INVENTION

In accordance with the invention input pulses are derived from a plurality of sources such as watthour meters. Each source is provided with a channel having a separate storage device for storing the input pulses.

The storage devices are interrogated or scanned at a rapid rate for the purpose of detecting the presence of stored pulses. When a stored pulse is detected, it is coupled to an output pulse device so that a corresponding impulse is supplied to a receiving device such as a demand meter and the progression of the scan to the next storage device is temporarily delayed. This delay is of a sufficient duration to assure prior operation of the receiving device. The system is extremely flexible. Thus, it makes virtually no difference whether the input pulses originate from several channels or from only one channel. Furthermore, the scan is so rapid that the provision of spare channels does not penalize the performance of the system appreciably.

BRIEF DESCRIPTION OF THE DRAWING

For a better understanding of the invention, reference may be had to the preferred embodiment, exemplary of the invention shown in the single FIGURE of the accompanying drawing.

DETAILED DESCRIPTION OF INVENTION

In order to simplify the presentation of the invention the present drawing is based on FIG. 1 of the C. A. Booker, Jr. U.S. Pat. No. 3,072,888 which issued Jan. 8, 1963. This patent discloses a totalizing system which has been embodied in commercial apparatus as shown for example in Bulletin 62—2 of File 42—500, published in 1962 by the Westinghouse Electric Corporation, Meter Division, Raleigh, N. C. The following components may be similar to components bearing the same reference characters in the Booker, Jr. patent: 5 panel; 7 squaring device; 17 power supply; B1 bus (also similar to bus B9 of the patent); B3 bus; J1–J20 contact jaws; P–PF panels; P1–P1F input devices; P2–P2F storage devices; P3–P3F interrogating devices.

The invention may be applied to any number of channels, seven channels being shown in the drawing as represented by the panels P-PF. Inasmuch as these panels are similar and inasmuch as they are fully described in the Booker, Jr. patent a brief review of the panel P at this point will suffice. The panel P carries an input device P1 which may receive input pulses from any desired source such as the pulse transmitter of a watthour meter. The pulse may be of a two-wire type or a three-wire type as shown in the aforesaid patent, sometimes referred to as an "impulse".

When a pulse is supplied to the input device P1 a pulse is delivered by the input device to a storage device P2. The storage device retains the pulse in storage until the storage device is interrogated or scanned by an interrogation device P3 and the stored pulse is thereupon read out to a bus B1.

The interrogation devices P3–P3F are arranged to interrogate or scan the storage devices of the seven channels successively. In a form described in the Booker, Jr. patent, the interrogation devices P3–P3F are components of a ring counter which is stepped by pulses supplied through a bus B3. At any instant only one of the interrogation devices P3–P3F is in a unique or effective condition wherein it scans its associated storage device P2–P2F.

The stored pulses supplied to the bus B1 by the storage devices are applied to a suitable receiving device DM in any conventional manner. This receiving device may derive from the stored pulses a suitable function such as the total of the pulses. For present purposes it will be assumed that the receiving device DM is a demand meter similar to that disclosed in the aforesaid Booker, Jr. patent. The stored pulses may be supplied from the bus B1 to the demand meter DM through any suitable amplifier or output pulse device 3'. For present purposes, it will be assumed that the output device 3' is similar to the output device 3 of the Booker, Jr. patent with the switch S1 of the patent arranged to develop impulses by connecting the capacitors C50 and C51 of the patent to a common bus.

The panel 15' carries equipment for supplying pulses to the bus B3 each of which advances the ring counter made up of the interrogation devices P3–P3F by one step. This panel replaces the corresponding panel 15 of the aforesaid Booker, Jr. patent.

The panel 15' carries a squaring device 7 which receives a sine-wave input and delivers square or rectangular pulses to one input of a two-input gate device X1. For present purposes it will be assumed that the squaring device 7 is similar to that bearing the same reference character in the aforesaid Booker, Jr. patent.

If a 60 Hz. input is applied to the squaring device 7, the squaring device may be arranged to provide a square-wave output having 60 pulses per second. If the squaring device includes a full-wave rectifier to rectify the incoming 60 Hz. signal the squaring device may provide a square-wave output having 120 pulses per second. If a 50 Hz. input signal if applied to the squaring device the output may be in the form of square waves at 50 pulses per second. If the squaring device includes a full-wave rectifier for the 50 Hz. input the output signal may be in the form of square waves at 100 pulses per second. Such squaring devices are well known in the art. It will be understood that other pulse rates may be employed if so desired.

The gate X1 is so arranged that in a first condition it passes the square-wave pulses from the squaring device 7 to the bus B3 for the purpose of advancing or stepping the ring counter formed by the interrogation devices P3–P3F. Under such circumstances the system here illustrated operates in a manner similar to the operation of the system shown in the Booker Jr. patent, except that the scan of the storage devices P2–P2F proceeds much more rapidly. When the gate X1 is in a second condition, it blocks the transmission of square-wave pulses from the squaring device 7 to the bus B3 and thus prevents stepping of the ring counter formed by the interrogation devices P3–P3F. The gate X1 is placed in its second condition by each output pulse delivered to the bus B1.

As shown in the drawing, the bus B1 is connected to a second input of the gate X1 through a monostable or "one shot" multivibrator X3. The gate X1 conveniently may be of the type known as an "AND" gate having two inputs.

When the one shot X3 is in its "off" state (with a zero input signal) the one shot delivers a "one" signal to the gate X1 and permits the gate to pass pulses from the squaring device 7 to the bus B3.

When the one shot is in its "on" state (a "one" signal is applied to the input of the one shot) a zero signal is applied to the gate X1 and the gate blocks pulses from the squaring device 7.

When the one shot X3 is operated to block the gate X1 such blocking is maintained for a time sufficient to assure operation of the receiving device DM before the gate X1 again permits passage of pulses from the squaring device 7. If desired a delay circuit may be interposed between the bus B1 and the input to the one shot X3. However, a conventional monostable or one shot multivibrator inherently has a time delay which may be selected to have the desired value.

In the discussion thus far given it is assumed that the bus B1 is connected directly to the input of the output device 3′ and to the input of the one shot X3. Various ratios of input to output of the system shown in the drawing may be obtained by locating a suitable divider X5 between the bus B1 and the inputs to the output device 3 and the one shot X3. For example the divider may have a ratio selected from the range 2:1 to 10:1 as desired.

To illustrate the operation of the system let it be assumed that three sources of pulses are associated respectively with the panels P, PA and PB and that the panels PC–PF are spares. Let it be assumed further that square pulses having a frequency of 60 pulses per second are delivered by the squaring device 7 to the gate X1.

As long as no pulses are received by the input devices P1, P1A and P1B the ring modulator formed by the interrogation devices P3–P3F steps at the rate of 60 steps per second.

If a pulse is then received by the input device P1 this pulse is stored in the storage device P2. When the interrogation thereafter reaches the storage device P2, the storage device is reset and a stored pulse is supplied to the bus B1. This stored pulse is supplied to the one shot X3 and the one shot removes its input to the gate X1. Consequently the gate blocks the supply of pulses from the squaring device 7 to the bus B3 and the ring modulator formed by the interrogation devices P3–P3F is prevented from stepping for the time required by the one shot to reset. For illustrative purposes, it will be assumed that this reset time is one second.

The stored pulse is also supplied by the bus B1 through the output device 3′ to the demand meter DM. Because of the one second dwell in the stepping of the ring modulator formed by the interrogation devices P3–P3F the demand meter DM has an adequate time to operate before stepping is resumed. With this arrangement the demand meter DM sees little difference between the application of a certain number of input pulses to each of the three channels or panels P, PA and PB and the application of the same total number of pulses to only one of the channels or panels.

Furthermore, the provision of four spare channels for possible later use does not interfere appreciably with the operation of the system with only three sources of input pulses. This is for the reason that only one-sixtieth of a second is required for the interrogation of each of the spare channels or panels.

I claim as my invention:

1. A pulse totalizing system for counting impulses derived from pulses initiated in response to registering movement of each of plural metering devices, said system comprising:

a plurality of pulse receiving channels, each of said channels including a pulse input means for receiving a pulse initiated by one of said metering devices, each channel further including a storage device and an interrogating device, wherein said storage device stores a pulse applied from said input means and supplies a corresponding pulse signal at a stored pulse output in response to an interrogating signal from said interrogating device, and wherein the interrogating devices are connected together to define a ring counter means for sequentially applying said interrogating signals to each storage device of said channels;

A gating control means having first and second inputs and an output wherein pulses applied to said first input are coupled to said output in response to the presence or absence of a signal at said second input, and wherein said output is connected to each of said interrogating devices for initiating the interrogating pulses in response to pulses applied to said first input;

a delay pulse generating means connected between each stored pulse output of the storage devices and said second input to said gating control means, wherein said delay pulse generating means supplies a delaying pulse having a fixed predetermined pulse period for controlling a corresponding predetermined delay of coupling pulses between said first input and said output of said gating control means upon the occurrence of a stored pulse output signal, whereby interrogating signals are prevented from being developed by said interrogating devices;

a source of scanning control pulses connected to said first input of said gating control means, wherein said scanning control pulses are generated at a high rate so as to have short pulse periods related to the minimum time period between pulses initiated by one of said metering devices so that each of said interrogating devices in said channels develops an interrogating signal within said minimum time period;

an impulse transmitting means including an output pulse device connected to each of said stored pulse outputs for supplying an impulse to be counted in response to each stored pulse output signal;

and a pulse totalizing receiver connected to said impulse transmitting means so as to receive said impulses for counting, wherein a predetermined time is required for registering said impulses at said receiver and is within the predetermined period of said delaying pulse which is substantially greater than the period of said scanning control pulses to minimize the time between the occurrence of a pulse at the pulse input means of each channel and the registering of a correspondingly generated impulse at said receiver.

2. The pulse totalizing system as claimed in claim 1 wherein each of said metering devices is a watt-hour meter and said pulse totalizing receiver is a demand metering device.

* * * * *